US011165955B2

(12) United States Patent
Takahashi et al.

(10) Patent No.: US 11,165,955 B2
(45) Date of Patent: Nov. 2, 2021

(54) ALBUM GENERATION APPARATUS, ALBUM GENERATION SYSTEM, AND ALBUM GENERATION METHOD

(71) Applicant: HONDA MOTOR CO., LTD., Tokyo (JP)

(72) Inventors: Shinya Takahashi, Wako (JP); Yasuaki Tezuka, Wako (JP); Yoshihide Yuza, Wako (JP); Atsushi Ito, Wako (JP); Shohei Suzuki, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/567,270

(22) Filed: Sep. 11, 2019

(65) Prior Publication Data

US 2020/0007759 A1    Jan. 2, 2020

Related U.S. Application Data

(63) Continuation of application No. PCT/JP2017/013520, filed on Mar. 31, 2017.

(51) Int. Cl.
*H04N 5/232* (2006.01)
*G06K 9/00* (2006.01)
*G06T 11/60* (2006.01)

(52) U.S. Cl.
CPC ....... *H04N 5/23229* (2013.01); *G06K 9/0063* (2013.01); *G06K 9/00362* (2013.01); *G06T 11/60* (2013.01)

(58) Field of Classification Search
CPC ............................. G06K 9/0063; G06T 11/60
See application file for complete search history.

(56) References Cited

U.S. PATENT DOCUMENTS

| 9,213,892 | B2 | 12/2015 | Heisele | |
|---|---|---|---|---|
| 2004/0064338 | A1* | 4/2004 | Shiota | H04N 1/00137 705/1.1 |
| 2004/0109063 | A1* | 6/2004 | Kusaka | H04N 1/00132 348/207.1 |

(Continued)

FOREIGN PATENT DOCUMENTS

| JP | H10-336576 A | 12/1998 |
|---|---|---|
| JP | 2005-267287 A | 9/2005 |

(Continued)

OTHER PUBLICATIONS

International Search Report for PCT/JP2017/013520 dated Jun. 20, 2017 (partially translated).

*Primary Examiner* — Mainul Hasan
(74) *Attorney, Agent, or Firm* — Thomas | Horstemeyer, LLP (57) ABSTRACT

An album generation apparatus comprises a first acquisition unit configured to acquire identification information for identifying a combination of a user and a mobile object, a second acquisition unit configured to acquire one or more images from one or more image capturing apparatuses, a selection unit configured to select, from the one or more images, an image including the combination of the user and the mobile object by using the identification information, and a generation unit configured to generate an album by using the selected image.

13 Claims, 8 Drawing Sheets

(56) References Cited

U.S. PATENT DOCUMENTS

| | | | | |
|---|---|---|---|---|
| 2006/0158526 A1* | 7/2006 | Kashiwa | ............... | G11B 27/10 |
| | | | | 348/211.11 |
| 2007/0067104 A1* | 3/2007 | Mays | ............... | G01C 21/3647 |
| | | | | 701/437 |
| 2010/0094546 A1* | 4/2010 | Ujino | ............... | G01C 21/3623 |
| | | | | 701/468 |
| 2013/0081082 A1* | 3/2013 | Riveiro Insua | .... | H04N 21/8549 |
| | | | | 725/38 |
| 2014/0177911 A1 | 6/2014 | Heisele | | |
| 2014/0258381 A1* | 9/2014 | Tani | ................. | H04L 67/2823 |
| | | | | 709/203 |
| 2015/0097962 A1* | 4/2015 | Rauscher | ............ | H04N 7/181 |
| | | | | 348/159 |
| 2015/0143236 A1* | 5/2015 | Tena Rodriguez | ... | G06F 40/106 |
| | | | | 715/273 |
| 2017/0026528 A1* | 1/2017 | Kim | .................. | G06F 16/5838 |
| 2019/0351283 A1* | 11/2019 | Smith | ............... | A63B 21/0051 |

FOREIGN PATENT DOCUMENTS

| | | |
|---|---|---|
| JP | 2006-020260 A | 1/2006 |
| JP | 2009-212701 A | 9/2009 |
| JP | 2014-123362 A | 7/2014 |
| JP | 2017-016388 A | 1/2017 |
| JP | 2017016388 A * | 1/2017 |
| WO | 2018/179310 A1 | 10/2018 |

* cited by examiner

ALBUM GENERATION APPARATUS, ALBUM GENERATION SYSTEM, AND ALBUM GENERATION METHOD

CROSS-REFERENCE TO RELATED APPLICATION

This application is a continuation of International Patent Application No. PCT/JP2017/013520 on Mar. 31, 2017, the entire disclosures of which is incorporated herein by reference.

TECHNICAL FIELD

The present invention relates to an album generation apparatus, an album generation system, and an album generation method.

BACKGROUND ART

In recent years, there has been increasing vehicles equipped with cameras to capture their surroundings. PTL 1 describes that when there is another vehicle or a fixed camera around a self-vehicle, the self-vehicle requests the other vehicle or the fixed camera to capture an image of the self-vehicle and acquires image data.

CITATION LIST

Patent Literature

PTL 1: Japanese Patent Laid-Open No. 2009-212701

SUMMARY OF INVENTION

Technical Problem

In the technology described in PTL 1, the image captured by the other vehicle or the fixed camera is automatically transmitted to the self-vehicle. By using such an image, generating an album has been a complicated operation for a user. In one aspect of the present invention, an object is to provide an advantageous technology for generating an album that includes an image of a mobile object.

Solution to Problem

In some embodiments of the present invention, there is provided an album generation apparatus including a first acquisition unit configured to acquire identification information for identifying a combination of a user and a mobile object, a second acquisition unit configured to acquire one or more images from one or more image capturing apparatuses, a selection unit configured to select, from the one or more images, an image including the combination of the user and the mobile object by using the identification information, and a generation unit configured to generate an album by using the selected image.

Advantageous Effect of Invention

According to the above means, an advantageous technology is provided for generating an album that includes an image of a mobile object.

BRIEF DESCRIPTION OF DRAWINGS

The accompanying drawings are included in the specification, constitute part thereof, illustrate embodiments of the present invention and, together with the description, are used to explain the principles of the present invention.

DESCRIPTION OF EMBODIMENTS

Embodiments of the present invention are described below with reference to the accompanying drawings. Like elements are given the same reference numerals throughout the various embodiments, and redundant descriptions thereof are omitted. Furthermore, each embodiment can be changed and combined as appropriate. In the following embodiments, a mobile object is a movable object, and examples of the mobile object include a vehicle, a ship, and an aircraft. In the following embodiments, a vehicle, in particular an automatic two-wheeled vehicle (so-called motorbike) is treated as an example of the mobile object, but the mobile object may be an automatic four-wheeled vehicle, or may be other mobile objects.

Figure 1:
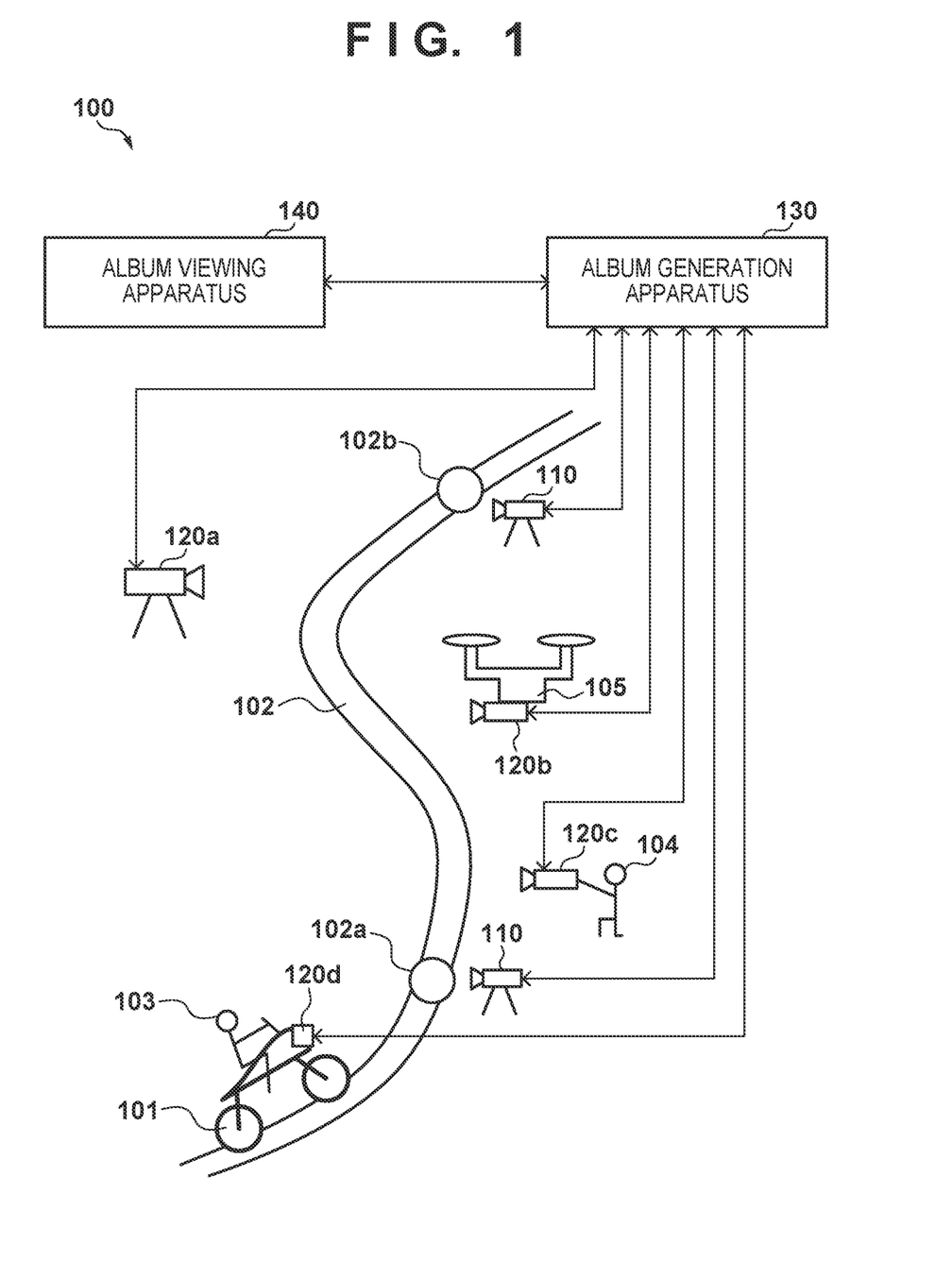
FIG. 1 is a diagram illustrating a configuration example of an album generation system according to an embodiment of the present invention.

With reference to FIG. 1, a configuration example and an operation overview of an album generation system 100 according to some embodiments are described. The album generation system 100 includes a service acceptance apparatus 110, image capturing apparatuses 120a to 120d, an album generation apparatus 130, and an album viewing apparatus 140.

The service acceptance apparatus 110 is an apparatus that accepts an application of an album providing service from a driver 103 of a vehicle 101. The album providing service is a service that is provided by the album generation system 100 and is a service that provides an album including an image of the vehicle 101 traveling a specific travel section 102 (mobile object during traveling), captured by a user of the service (hereinafter, user). Hereinafter, the album providing service is referred to simply as the service. The specific travel section 102 is a target section of the album to be generated. The driver 103 becomes a user of the service by applying for the service.

The service acceptance apparatus 110 captures an image of the vehicle 101 and the driver 103 in accepting the service application and transmits the image to the album generation apparatus 130. The service acceptance apparatus 110 receives a service identification number as a response of the transmission and notifies the driver 103 of this number. After traveling of the travel section 102 is finished, the driver 103 utilizes this number to acquire the album. The user may also specify editing conditions of the album when applying for the service.

The service acceptance apparatus 110 may be prepared by a provider of the album generation system 100 and may be installed at a start point 102a and an end point 102b of the travel section 102. An applicant for use of the service may use the service acceptance apparatus 110 installed at the start point 102a of the travel section 102 to apply for the service and then may travel the travel section 102. In this case, the image of the vehicle 101 and the driver 103 to be transmitted to the album generation apparatus 130 is captured before the driver 103 travels the travel section 102. Alternatively, the applicant for use of the service may use the service acceptance apparatus 110 installed at the end point 102b of the travel section 102 to apply for the service after traveling the travel section 102. In this case, the image of the vehicle 101 and the driver 103 to be transmitted to the album generation apparatus 130 is captured after the driver 103 has traveled the travel section 102.

The driver 103 may utilize a driver's own electronic device (for instance, a mobile device with a camera such as a smart phone) as the service acceptance apparatus 110. In this case, the driver 103 applies for the service through a website provided by the album generation apparatus 130. At that time, the driver 103 transmits the image of the driver himself/herself and the vehicle to the album generation apparatus 130. The driver 103 receives the service identification number from the album generation apparatus 130 as a response of the transmission by using the driver's own electronic device. The application by using the driver's own electronic device may be performed before or after traveling of the travel section 102.

Each of the image capturing apparatuses 120a to 120d is an apparatus for capturing an image of a vehicle traveling the travel section 102. The image capturing apparatuses 120a to 120d are collectively referred to as an image capturing apparatus 120 in the case where it is not necessary to distinguish the image capturing apparatuses 120a to 120d in particular. The image capturing apparatus 120 transmits the captured image to the album generation apparatus 130. The image may be a still image or a moving image. The image capturing apparatus 120 may be fixed to a point at which the travel section 102 can be captured such as the image capturing apparatus 120a, may be installed on an unmanned air vehicle 105 capable of autonomous flight (for instance, a drone) such as the image capturing apparatus 120b, may be used by a user 104 that captures an image such as the image capturing apparatus 120c, or may be installed on the vehicle 101 such as the image capturing apparatus 120d. Each of the unmanned air vehicle 105 and the vehicle 101 is one example of the mobile object. The album generation system 100 may include at least one of the image capturing apparatuses 120a to 120d or may include a plurality of each of the image capturing apparatuses 120a to 120d.

The image capturing apparatus 120a may detect that a mobile object is present in an image capturing area, and may automatically capture an image of the mobile object. The unmanned air vehicle 105 on which the image capturing apparatus 120b is installed flies along the travel section 102. The image capturing apparatus 120b may detect that a mobile object is present in the image capturing area, and may automatically capture an image of the mobile object. The album generation apparatus 130 is an apparatus for generating an album of images during traveling of the vehicle 101. The album viewing apparatus 140 is an apparatus with which a user views an album of images during traveling of the vehicle 101. The user requests the album generation apparatus 130 to provide an album by using the album viewing apparatus 140. In response, the album generation apparatus 130 generates an album of images during traveling and transmits the album to the album viewing apparatus 140. The album viewing apparatus 140 displays the received album on a display apparatus.

Figure 2A:
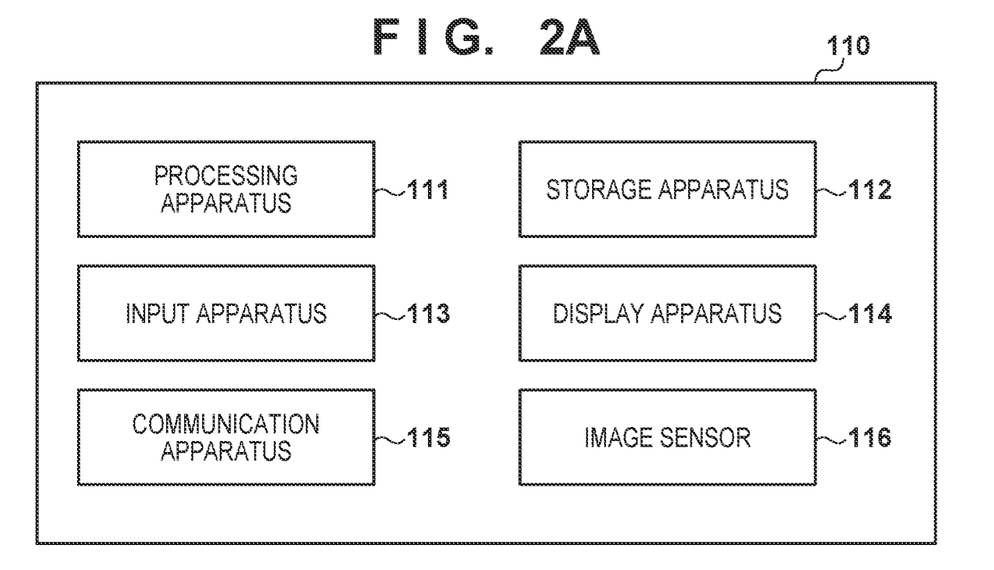
FIG. 2A is a diagram illustrating a configuration example of a service acceptance apparatus according to the embodiment of the present invention.

With reference to FIGS. 2A to 2D, a hardware configuration example of each apparatus included in the album generation system 100 will be described. As illustrated in FIG. 2A, the service acceptance apparatus 110 includes a processing apparatus 111, a storage apparatus 112, an input apparatus 113, a display apparatus 114, a communication apparatus 115, and an image sensor 116. The processing apparatus 111 is an apparatus that executes processing to be performed by the service acceptance apparatus 110, and is configured with a processor such as a CPU, for instance. The storage apparatus 112 is an apparatus for storing data for performing processing by the service acceptance apparatus 110, and is configured with a memory such as a RAM or a ROM, for instance.

The input apparatus 113 is an apparatus for receiving an input from a user of the service acceptance apparatus 110 (for instance, driver 103), and is configured, for instance, with a touch pad, a button, or the like. The display apparatus 114 is an apparatus for presenting information to a user of the service acceptance apparatus 110, and is configured with, for instance, a liquid crystal display, a speaker, or the like. The input apparatus 113 and the display apparatus 114 may be configured with an integrated apparatus such as a touch screen.

The communication apparatus 115 is an apparatus for the service acceptance apparatus 110 to communicate with another apparatus, and is configured with a network card or the like in a case of performing wired communication, and is configured with an antenna, a signal processing circuit, or the like in a case of performing wireless communication. The image sensor 116 is a sensor for generating an electric signal based on light incident through a lens included in the service acceptance apparatus 110. The processing apparatus 111 generates an image by processing an electric signal generated by the image sensor 116.

Figure 2B:
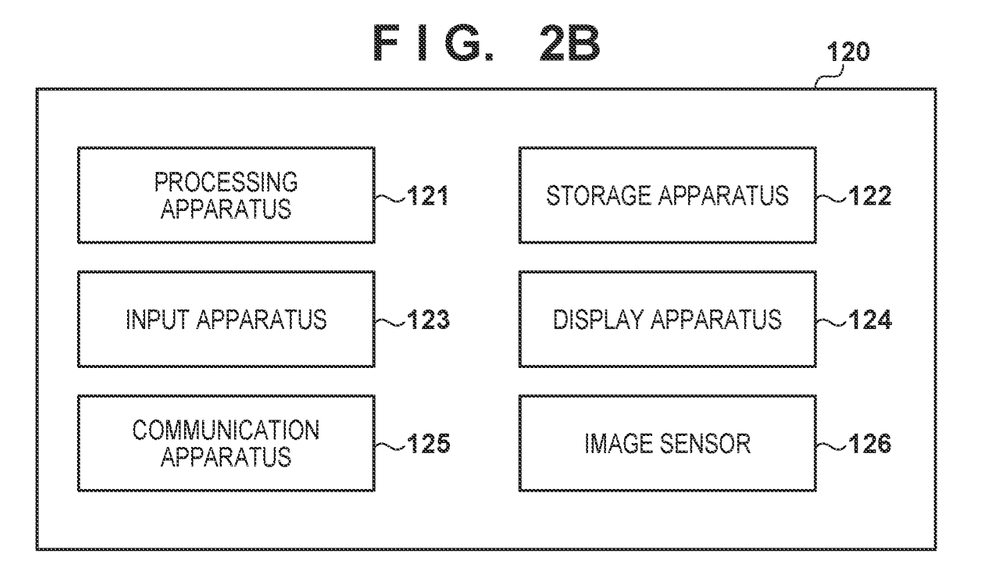
FIG. 2B is a diagram illustrating a configuration example of an image capturing apparatus according to the embodiment of the present invention.

As illustrated in FIG. 2B, the image capturing apparatus 120 includes a processing apparatus 121, a storage apparatus 122, an input apparatus 123, a display apparatus 124, a communication apparatus 125, and an image sensor 126. The processing apparatus 121, the storage apparatus 122, the input apparatus 123, the display apparatus 124, the communication apparatus 125, and the image sensor 126 are the same as the processing apparatus 111, the storage apparatus 112, the input apparatus 113, the display apparatus 114, the communication apparatus 115, and the image sensor 116, so duplicated description will be omitted.

Figure 2C:
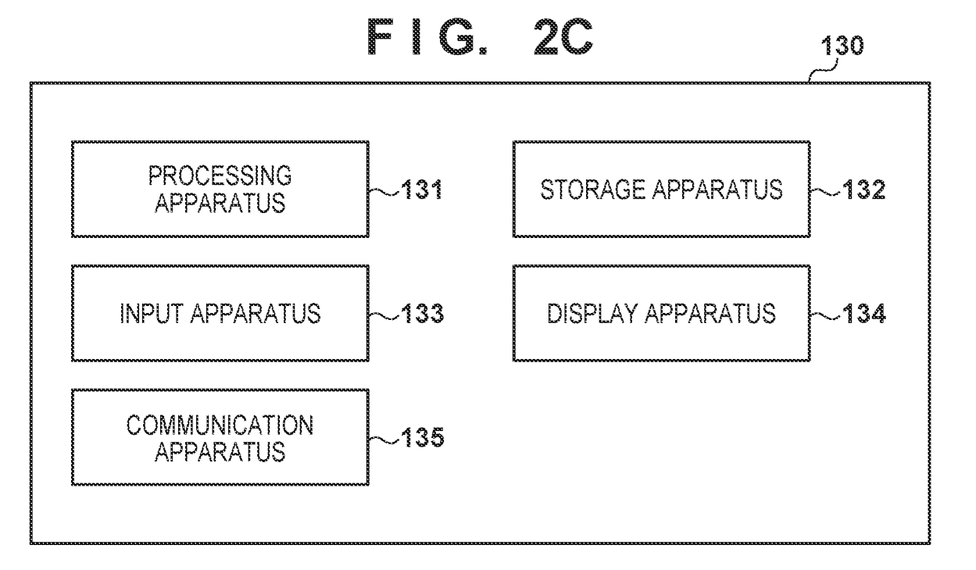
FIG. 2C is a diagram illustrating a configuration example of an album generation apparatus according to the embodiment of the present invention.

As illustrated in FIG. 2C, the album generation apparatus 130 includes a processing apparatus 131, a storage apparatus 132, an input apparatus 133, a display apparatus 134, and a communication apparatus 135. The processing apparatus 131, the storage apparatus 132, the input apparatus 133, the display apparatus 134, and the communication apparatus 135 are the same as the processing apparatus 111, the storage apparatus 112, the input apparatus 113, the display apparatus 114, and the communication apparatus 115, so duplicated description will be omitted. The album generation apparatus 130 processes a large amount of data, and is configured, for instance, with a computer for a server. Furthermore, the storage apparatus 132 may be configured with a disk device or the like in addition to a memory.

Figure 2D:
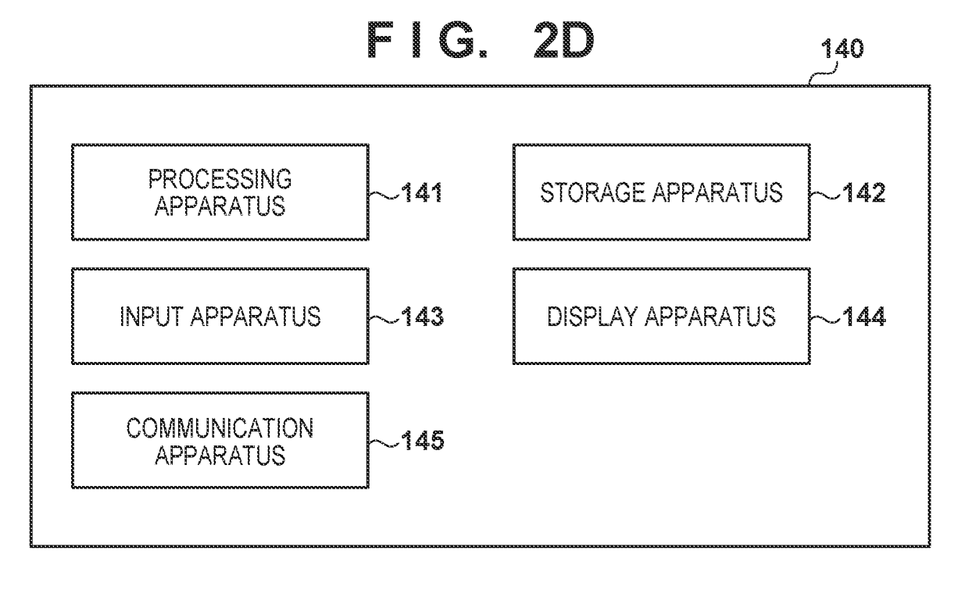
FIG. 2D is a diagram illustrating a configuration example of an album viewing apparatus according to the embodiment of the present invention.

As illustrated in FIG. 2D, the album viewing apparatus 140 includes a processing apparatus 141, a storage apparatus 142, an input apparatus 143, a display apparatus 144, and a communication apparatus 145. The processing apparatus 141, the storage apparatus 142, the input apparatus 143, the display apparatus 144, and the communication apparatus 145 are the same as the processing apparatus 111, the storage apparatus 112, the input apparatus 113, the display apparatus 114, and the communication apparatus 115, so duplicated description will be omitted. The album viewing apparatus 140 is a mobile device such as a smart phone, a personal computer, or the like.

Figure 3:
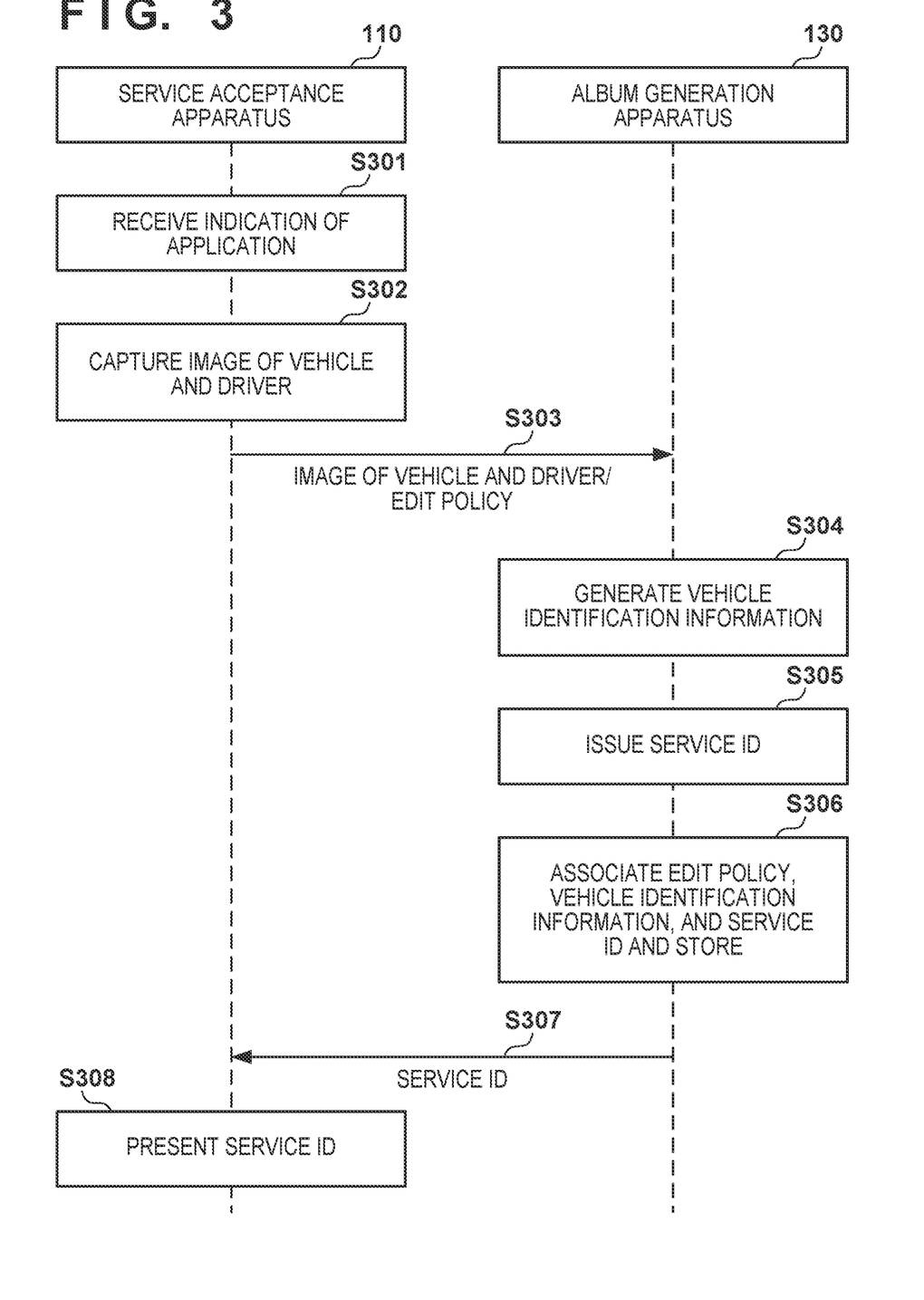
FIG. 3 is a diagram illustrating an example of an acceptance process for a service application according to the embodiment of the present invention.

With reference to FIG. 3, an example of an acceptance process for a service application will be described. This process is performed by the service acceptance apparatus 110 and the album generation apparatus 130 cooperating with each other. The processing in the service acceptance apparatus 110 is performed by reading a program stored in the storage apparatus 112 and executing instructions included in the program by the processing apparatus 111. The processing in the album generation apparatus 130 is performed by reading a program stored in the storage apparatus 132 and executing instructions included in the program by the processing apparatus 131.

In step S301, the service acceptance apparatus 110 receives an indication of a service application from the driver 103 by using the input apparatus 113. The service acceptance apparatus 110 receives an edit policy for an album from the driver 103 simultaneously with the indication of the service application.

Figure 6A:
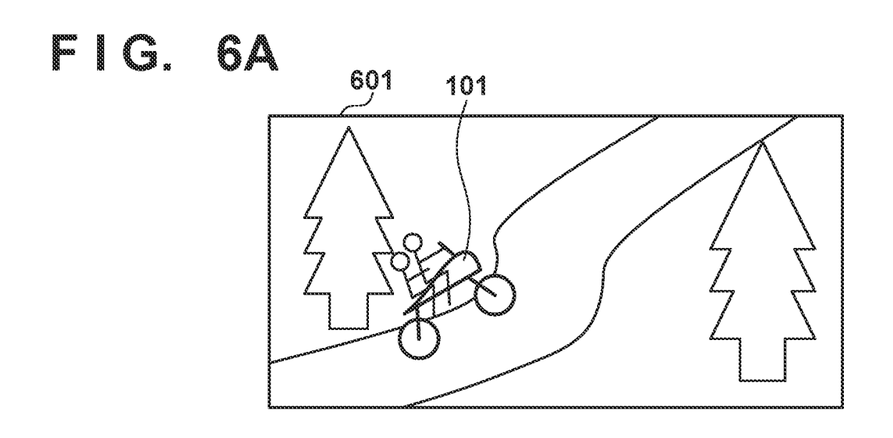
FIG. 6A is a diagram illustrating an example of a tandem traveling image capturing mode according to the embodiment of the present invention.
Figure 6B:
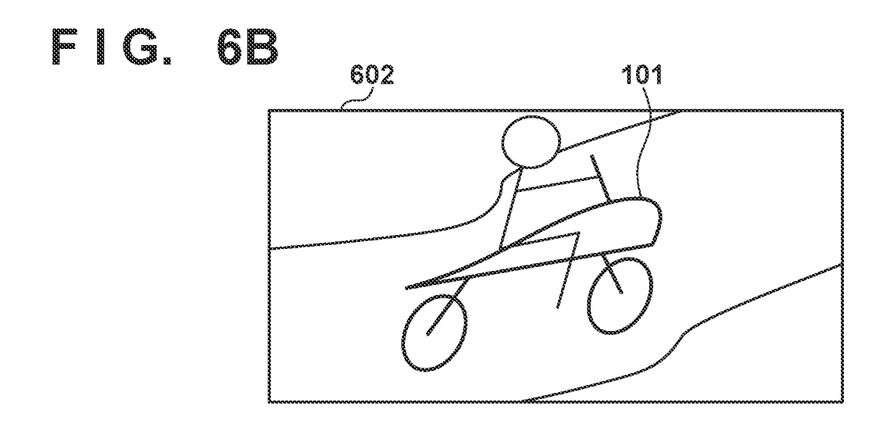
FIG. 6B is a diagram illustrating an example of a mountain pass traveling image capturing mode according to the embodiment of the present invention.
Figure 6C:
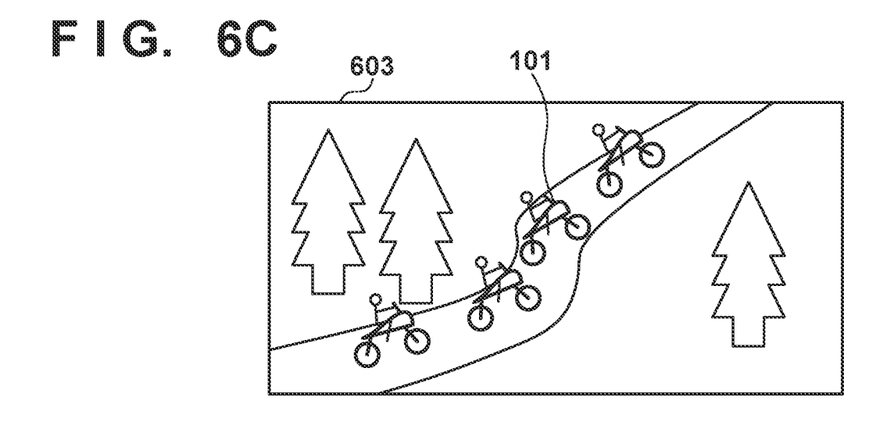
FIG. 6C is a diagram illustrating an example of a group traveling image capturing mode according to the embodiment of the present invention.

The edit policy of the album includes, for instance, a clipping method of the traveling vehicle 101. The clipping method includes, for instance, a tandem traveling image capturing mode, a mountain pass traveling image capturing mode, and a group traveling image capturing mode. The tandem traveling image capturing mode is an image capturing mode in a case of traveling and riding in tandem, and, as illustrated in FIG. 6A, an image 601 of the vehicle 101 is clipped within a range where surrounding landscape is recognized. The mountain pass traveling image capturing mode is an image capturing mode in a case of traveling and riding alone through a mountain pass, and, as illustrated in FIG. 6B, an image 602 is clipped such that the vehicle 101 occupies a large part of the image. The group traveling image capturing mode is an image capturing mode in a case of traveling by a plurality of vehicles, and an image 603 is clipped for including the whole of the plurality of vehicles 101, as illustrated in FIG. 6C. In addition, the edit policy for the album may include a type of a sound effect, a type of BGM, a prioritized camera angle (front, side, back), and the like.

Figure 7A:
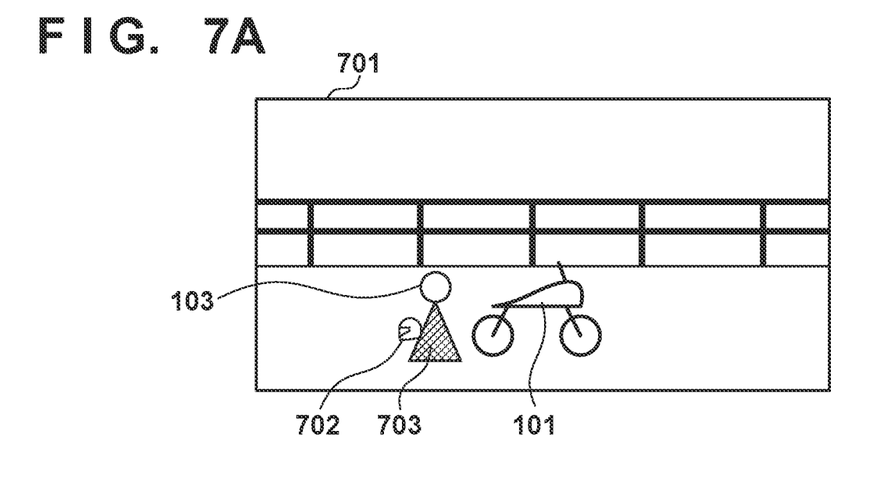
FIG. 7A is a diagram illustrating an example of a captured image according to the embodiment of the present invention.

In step S302, the service acceptance apparatus 110 captures an image of the driver 103 and the vehicle 101. An example of an image 701 captured here is illustrated in FIG. 7A. The service acceptance apparatus 110 captures an image 701 including the vehicle 101, and a helmet 702 and wear 703 of the driver 103. As described above, the image 701 may be captured before traveling of the travel section 102, or may be captured after traveling. In step S303, the service acceptance apparatus 110 transmits the edit policy received in step S301 and the image captured in step S302 to the album generation apparatus 130, and then the album generation apparatus 130 receives them.

In step S304, the album generation apparatus 130 generates identification information for identifying a combination of the driver 103 and the vehicle 101 from the received image. Hereinafter, this identification information is referred to as vehicle identification information. For instance, the album generation apparatus 130 generates vehicle identification information including at least one of appearance of the driver 103 and/or appearance of the vehicle 101. The appearance of the driver 103 may include at least one of the helmet 702 and/or the wear 703 of the driver 103. For instance, the album generation apparatus 130 identifies color of the helmet 702 and color of the wear 703 from the image of the driver 103 and identifies color and a model of the vehicle 101 from the image of the vehicle 101. The album generation apparatus 130 defines these identified combinations of information as the vehicle identification information.

In step S305, the album generation apparatus 130 issues a new service ID. The service ID is a number for uniquely identifying each instance of the album providing service. In step S306, the album generation apparatus 130 associates the edit policy received in step S303, the vehicle identification information generated in step S304, and the service ID issued in step S305 with each other and stores them in the memory apparatus 132.

In step S307, the album generation apparatus 130 transmits the service ID issued in step S305 to the service acceptance apparatus 110, and then the service acceptance apparatus 110 receives the service ID. In step S308, the service acceptance apparatus 110 presents the service ID received in step S306 to the driver 103.

In the operation example described above, the edit policy is received in step S301 and is transmitted to the album generation apparatus 130 in step S303. These steps may be omitted. In this case, the album generation apparatus 130 may generate an album in line with a default edit policy, the same user's previous edit policy, or a recommended edit policy based on edit policies of the other users.

In the operation example described above, the album generation apparatus 130 generates the vehicle identification information in step S304. Instead of this operation, the service acceptance apparatus 110 may generate the vehicle identification information by performing step S304 and may transmit the vehicle identification information to the album generation apparatus 130. In either of the manners, the album generation apparatus 130 can acquire the vehicle identification information.

Figure 4:
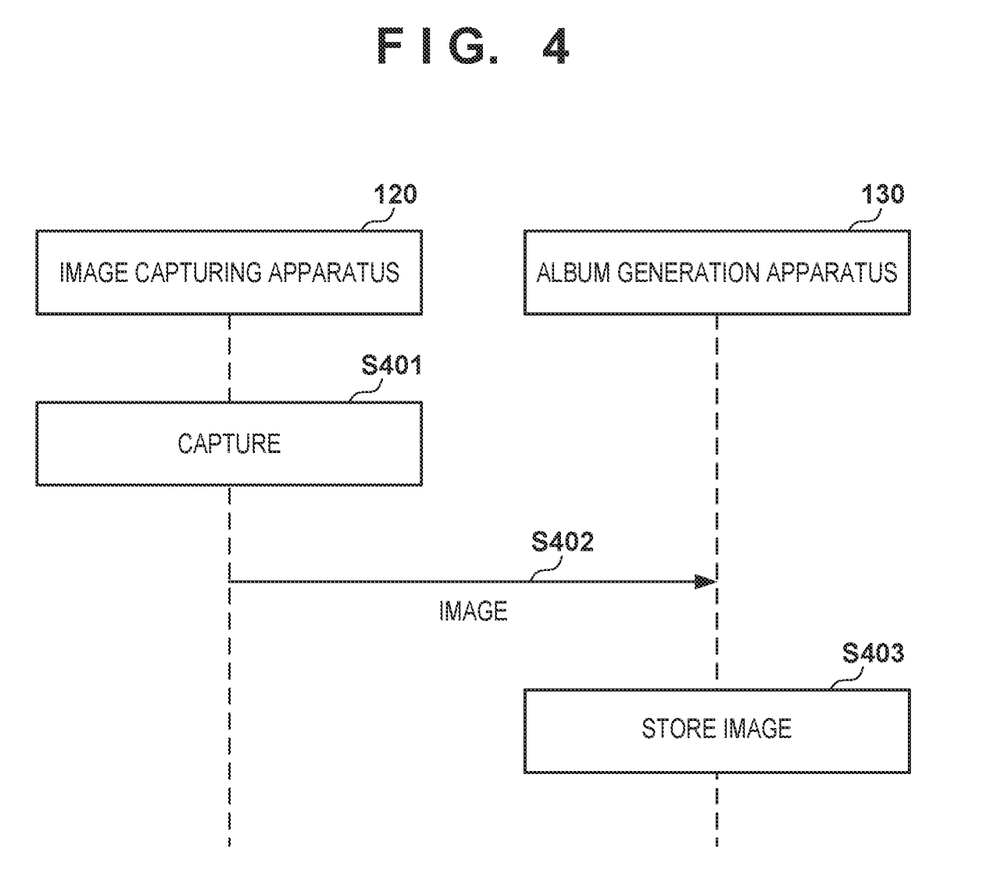
FIG. 4 is a diagram illustrating an example of a process for registering an image according to the embodiment of the present invention.

With reference to FIG. 4, an example of a process for registering an image will be described. This process is performed by the image capturing apparatus 120 and the album generation apparatus 130 cooperating with each other. The processing in the image capturing apparatus 120 is performed by reading a program stored in the storage apparatus 122 and executing instructions included in the program by the processing apparatus 121. The processing in the album generation apparatus 130 is performed by reading a program stored in the storage apparatus 132 and executing instructions included in the program by the processing apparatus 131.

Figure 7B:
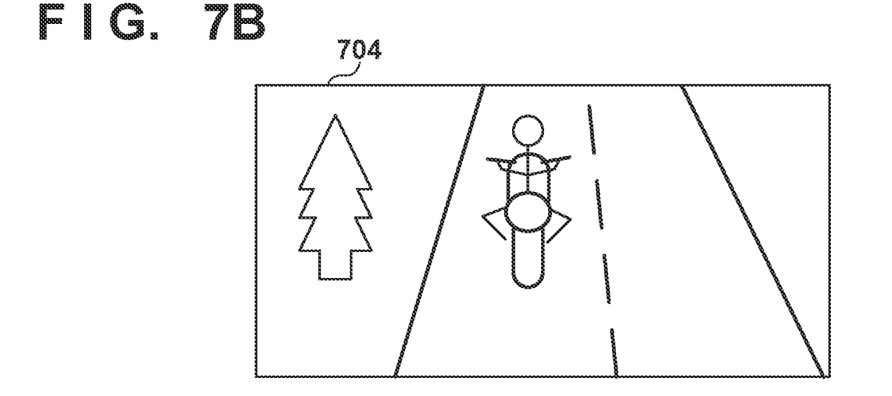
FIG. 7B is a diagram illustrating an example of a captured image according to the embodiment of the present invention.
Figure 7C:
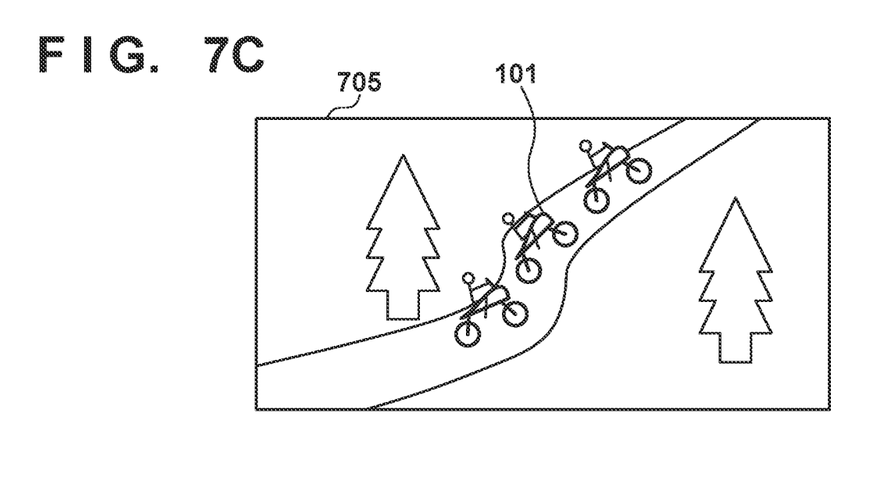
FIG. 7C is a diagram illustrating an example of a captured image according to the embodiment of the present invention.

In step S401, the image capturing apparatus 120 captures an image by using an image sensor 126. The image may be a still image or a moving image (for instance, a moving image of approximately 10 seconds). Various images are captured depending on an installation position of the image capturing apparatus 120. For instance, the image capturing apparatus 120d installed on the vehicle 101 captures an image 704 of another vehicle viewed from behind as illustrated in FIG. 7B. The image capturing apparatus 120b installed on the unmanned air vehicle 105 captures an image 705 of the vehicle 101 viewed from the sky as illustrated in FIG. 7C. In step S402, the image capturing apparatus 120 transmits the image captured in step S401 to the album generation apparatus 130, and then the album generation apparatus 130 receives the captured image. In step S403, the album generation apparatus 130 stores the image received in step S402 in the storage apparatus 132. In this step, the album generation apparatus 130 may store the image in association with the identification information of the image capturing apparatus 120 that has captured the image.

The processing of the image capturing apparatus 120 (step S401 to step S403) may be started, for instance, by activation of the image capturing apparatus 120, then be repeatedly executed (for instance, every second) and be terminated by a stop of the image capturing apparatus 120. Alternatively, the processing of the image capturing apparatus 120 may be performed in accordance with an instruction from the user 104 that captures an image.

Instead of transmitting an image to the album generation apparatus 130 every time the image is captured, the image capturing apparatus 120 may store the image in the storage apparatus 112 thereof, and a plurality of images may be collectively transmitted to the album generation apparatus 130 (for instance, in a case of being indicated by the user 104 that captures the image, or being remotely indicated by the album generation apparatus 130, or in a case where a certain time (for instance, one hour) elapses.

Figure 5:
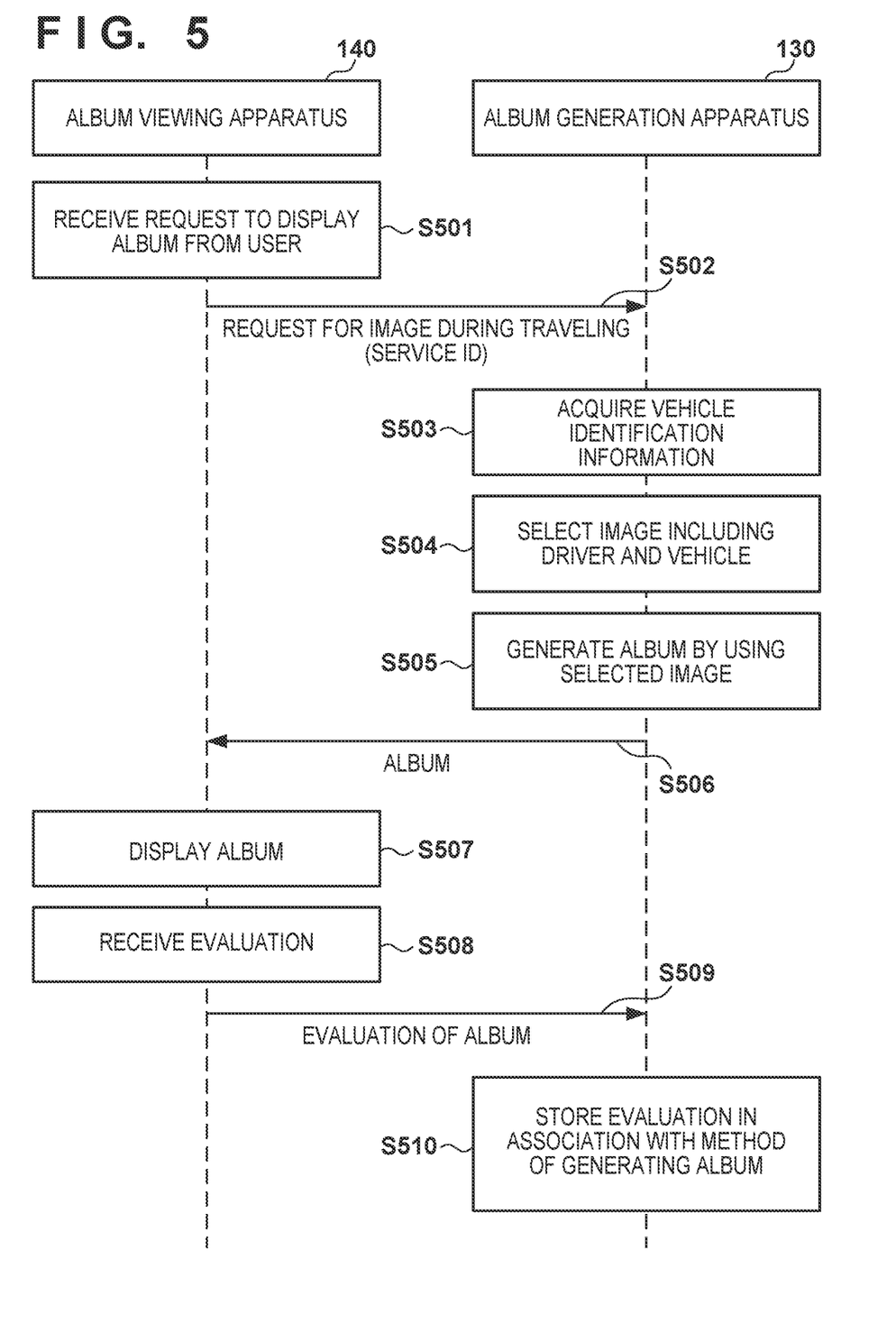
FIG. 5 is a diagram illustrating an example of a process for generating and displaying an album according to the embodiment of the present invention.

With reference to FIG. 5, an example of processing for generating and displaying an album will be described. This processing is performed by the album viewing apparatus 140 and the album generation apparatus 130 cooperating with each other. The processing in the album viewing apparatus 140 is performed by reading a program stored in the storage apparatus 142 and executing instructions included in the program by the processing apparatus 141. The processing in the album generation apparatus 130 is performed by reading a program stored in the storage apparatus 132 and executing instructions included in the program by the processing apparatus 131.

In step S501, the album viewing apparatus 140 receives a request to display an album of images during traveling from a user (for instance, the driver 103). The request includes the service ID presented in step S308 in FIG. 3. In step S502, the album viewing apparatus 140 transmits the request including the service ID received in step S501, to album generation apparatus 130, and then the album generation apparatus 130 receives the request.

In step S503, the album generation apparatus 130 reads the vehicle identification information associated with the service ID received in step S502 from the storage apparatus 132. As described above, the storage apparatus 132 stores the vehicle identification information in step S306 in FIG. 3. In step S504, the album generation apparatus 130 uses the vehicle identification information read in step S503 to select an image, of one or more images stored in the storage apparatus 132, including the combination of the driver 103 and the vehicle 101 that is a target for generating an album.

In step S505, the album generation apparatus 130 uses the image selected in step S504 to generate the album. When an edit policy is specified by the user, the album generation apparatus 130 generates the album in line with this edit policy. The generation of the album includes clipping a scene from a moving image, coupling one or more images, trimming an image, inserting BGM, adding a sound effect, and the like. When the edit policy is specified by the user, the album generation apparatus 130 generates the album in line with this edit policy. As for parameters that are not set in details in the user's edit policy, the album generation apparatus 130 determines the parameters by itself.

In step S506, the album generation apparatus 130 transmits the album generated in step S505 to the album viewing apparatus 140, and then the album viewing apparatus 140 receives the album. In step S507, the album viewing apparatus 140 displays the album received in step S506 with the display apparatus 144.

In step S508, the album viewing apparatus 140 acquires evaluation of the album from the user. The evaluation may have two levels, either "good" or "bad", or may have three or more levels. In step S509, the album viewing apparatus 140 transmits the evaluation received in step S508 to the album generation apparatus 130, and then the album generation apparatus 130 receives the evaluation.

In step S510, the album generation apparatus 130 stores the evaluation of the album in the storage apparatus 132 in association with a method of generating the album. The album generation apparatus 130 may utilize this evaluation to generate a new album in the album generation of step S505 in a case of providing future services. Specifically, the album generation apparatus 130 may determine parameters that are not set in details in the user's edit policy, by performing machine learning by using previously acquired evaluations, and may generate an album depending on those parameters.

In FIGS. 3 to 5 described above, processing is performed by executing the program by the processing apparatus included in each apparatus of the album generation system 100. Alternatively, each apparatus may include a dedicated circuit (for instance, ASIC) for performing part or all of the above-described processes.

SUMMARY OF EMBODIMENTS

Configuration 1
An album generation apparatus (130) including
a first acquisition unit (131, S304) configured to acquire identification information for identifying a combination of a user (103) and a mobile object (101),
a second acquisition unit (131, S402) configured to acquire one or more images from one or more image capturing apparatuses (120),
a selection unit (131, S504) configured to select, from the one or more images, an image including the combination of the user and the mobile object by using the identification information, and
a generation unit (131, S505) configured to generate an album by using the selected image.

This configuration enables the album of a mobile object during traveling to be provided to the user of the mobile object.

Configuration 2

The album generation apparatus according to Configuration 1, wherein the one or more image capturing apparatuses capture an image of a mobile object that travels a target section (102) for which the album is to be generated.

This configuration enables generation of the album for a specific section.

Configuration 3

The album generation apparatus according to Configuration 1 or 2, wherein the first acquisition unit is configured to acquire the identification information from an image of the user and the mobile object captured before or after traveling the target section for which the album is to be generated.

According to this configuration, the identification information can be acquired by capturing the image of the user and the mobile object.

Configuration 4

The album generation apparatus according to any one of Configurations 1 to 3, wherein an image of the user and the mobile object is captured by an image capturing apparatus (110) installed at a start point or an end point of the target section for which the album is to be generated.

This configuration enables capturing of the image of the user and the vehicle before and after the specific section.

Configuration 5

The album generation apparatus according to any one of Configurations 1 to 4, wherein the identification information includes at least one of appearance of the user and/or appearance of the mobile object.

This configuration allows the image to be identified by the appearance of the user or the appearance of the mobile object.

Configuration 6

The album generation apparatus according to any one of Configurations 1 to 5, wherein the mobile object is an automatic two-wheeled vehicle, and the appearance of the user includes at least one of a helmet (702) and/or wear (703) of the user.

This configuration makes it possible to identify the image including the user and the mobile object easily and reliably without complicated processing by identifying the image by using an object worn by the user.

Configuration 7

The album generation apparatus according to any one of Configurations 1 to 6, wherein the generation unit generates the album in line with a policy specified by the user.

This configuration enables generation of the album suitable for the user's preferences.

Configuration 8

The album generation apparatus according to any one of Configurations 1 to 7, the album generation apparatus further including a unit for providing the album for the user, and a unit for acquiring evaluation of the album from the user, wherein the generation unit generates a new album based on the evaluation.

According to this configuration, the evaluation of generation of the album is fed back, thereby allowing to generate the album suitable for the user's preferences.

Configuration 9

The album generation apparatus according to any one of Configurations 1 to 8, wherein the one or more image capturing apparatuses include an image capturing apparatus (120*a*) fixed to a point at which an image in a target section of the album to be generated be captured.

This configuration enables the album to include an image from a specific point.

Configuration 10

The album generation apparatus according to any one of Configurations 1 to 9, wherein the one or more image capturing apparatuses include an image capturing apparatus (102*b*) installed on an unmanned air vehicle (105).

This configuration enables the album to include an image from the sky.

Configuration 11

An album generation system (100) including one or more image capturing apparatuses (120), a first acquisition unit (131, S304) configured to acquire identification information for identifying a combination of a user (103) and a mobile object (101), a second acquisition unit (131, S402) configured to acquire one or more images from one or more image capturing apparatuses (120), a selection unit (131, S504) configured to select, from the one or more images, an image that includes the combination of the user and the mobile object by using the identification information, and a generation unit (131, S505) configured to generate an album by using the selected image.

This configuration enables provision of the album of the mobile object during traveling to the user of the mobile object.

Configuration 12

A method of generating an album, the method including acquiring (S304) identification information for identifying a combination of a user (103) and a mobile object (101), acquiring (S402) one or more images from one or more image capturing apparatuses (120), selecting (S504), from the one or more images, an image including the combination of the user and the mobile object by using the identification information, and generating (S505) an album by using the selected image.

This configuration enables provision of the album of the mobile object during traveling to the user of the mobile object.

Configuration 13

A program including instructions for execution by one or more processors (131) when the program is executed by the one or more processors, the program including the instructions of acquiring (S304) identification information for identifying a combination of a user (103) and a mobile object (101), acquiring (S402) one or more images from one or more image capturing apparatuses (120), selecting, from the one or more images, an image including the combination of the user and the mobile object (S504) by using the identification information, and generating (S505) an album by using the selected image.

This configuration enables provision of the album of the mobile object during traveling to the user of the mobile object.

The present invention is not limited to the embodiments described above, and various changes and modifications can be made without departing from the spirit and scope of the present invention. Accordingly, the following claims are appended to make public the scope of the invention.

What is claimed is:

1. An album generation apparatus comprising:
a processor; and
instructions executable by the processor configured to:

acquire identification information for identifying a first appearance of a user and a second appearance of a vehicle, the first appearance of the user including a color of a helmet of the user and/or a color of wear of the user;

acquire one or more images from one or more image capturing apparatuses;

select, from the one or more images, an image including both of the user having the first appearance including the color of the helmet of the user and/or the color of the wear of the user and the vehicle having the second appearance; and generate an album by using the selected image.

2. The album generation apparatus according to claim 1, wherein the one or more image capturing apparatuses capture an image of the vehicle that travels a target section for which the album is to be generated.

3. The album generation apparatus according to claim 1, wherein the instructions executable by the processor are further configured to acquire the identification information from an image of the user and the vehicle captured before or after traveling the target section for which the album is to be generated.

4. The album generation apparatus according to claim 1, wherein an image of the user and the vehicle is captured by an image capturing apparatus installed at a start point or an end point of a target section for which the album is to be generated.

5. The album generation apparatus according to claim 1, wherein the vehicle is an automatic two-wheeled vehicle, and the appearance of the user includes at least one of the helmet and/or wear of the user.

6. The album generation apparatus according to claim 1, wherein the album is generated in line with a policy specified by the user.

7. The album generation apparatus according to claim 1, wherein the instructions executable by the processor are further configured to:

provide the album for the user;

acquire evaluation of the album from the user; and generate a new album based on the evaluation.

8. The album generation apparatus according to claim 1, wherein the one or more image capturing apparatuses include an image capturing apparatus fixed to a point at which a target section of the album to be generated is possible to be captured.

9. The album generation apparatus according to claim 1, wherein the one or more image capturing apparatuses include an image capturing apparatus installed on an unmanned air vehicle.

10. An album generation system comprising:

one or more image capturing apparatuses;

a processor; and instructions executable by the processor configured to:

acquire identification information for identifying a first appearance of a user and a second appearance of a vehicle, the first appearance of the user including a color of a helmet of the user and/or a color of wear of the user;

acquire one or more images from the one or more image capturing apparatuses;

select, from the one or more images, an image that includes both of the user having the first appearance including the color of the helmet of the user and/or the color of the wear of the user and the vehicle having the second appearance; and generate an album by using the selected image.

11. A method of generating an album, the method comprising:

acquiring identification information for identifying a first appearance of a user and a second appearance of a vehicle, the first appearance of the user including a color of a helmet of the user and/or a color of wear of the user;

acquiring one or more images from one or more image capturing apparatuses;

selecting, from the one or more images, an image including both of the user having the first appearance including the color of the helmet of the user and/or the color of the wear of the user and the vehicle having the second appearance; and generating an album by using the selected image.

12. A non-transitory storage medium comprising a program including instructions for execution by one or more processors, when the program is executed by the one or more processors, the program including the instructions of:

acquiring identification information for identifying a first appearance of a user and a second appearance of a vehicle, the first appearance of the user including a color of a helmet of the user and/or a color of wear of the user;

acquiring one or more images from one or more image capturing apparatuses;

selecting, from the one or more images, an image including both of the user having the first appearance including the color of the helmet of the user and/or the color of the wear of the user and the vehicle having the second appearance; and generating an album by using the selected image.

13. The album generation apparatus according to claim 1, wherein the first appearance of the user includes both the color of the helmet of the user and the color of the wear of the user.

* * * * *